United States Patent [19]
Ledoux et al.

[11] 3,933,124
[45] Jan. 20, 1976

[54] ARTIFICIAL HABITATS

[75] Inventors: Claude Ledoux, Massy; Pierre Raoul, Epinay-Orge; Jean-Claude Thomas, Neuilly-Seine, all of France

[73] Assignee: Rhone-Progil, Courbevoie, France

[22] Filed: May 31, 1974

[21] Appl. No.: 454,236

[30] Foreign Application Priority Data
Mar. 26, 1973 France ............... 73.10735

[52] U.S. Cl. ................................. 119/2; 119/3
[51] Int. Cl.² ................................ A01K 61/00
[58] Field of Search .................... 119/2, 3, 4, 5

[56] References Cited
UNITED STATES PATENTS

| | | | |
|---|---|---|---|
| 3,083,686 | 4/1963 | Thorsell et al. ............... | 119/5 X |
| 3,118,424 | 1/1964 | Willinger ....................... | 119/5 X |
| 3,316,881 | 5/1967 | Fischer .......................... | 119/4 |
| 3,561,402 | 2/1971 | Ishida ............................ | 119/3 |
| 3,658,034 | 4/1972 | Day et al. ...................... | 119/2 |
| 3,695,229 | 10/1972 | Renn ............................. | 119/4 |
| 3,858,554 | 1/1975 | Beaupoil et al. .............. | 119/2 |

*Primary Examiner*—Hugh R. Chamblee
*Attorney, Agent, or Firm*—McDougall, Hersh & Scott

[57] ABSTRACT

Artificial habitats for rearing aquatic fauna and the like. The habitats comprise a plurality of structures deposited on the bed of a body of water. Each structure comprises longitudinal members of thermoplastic material characterized by a helicoidal shape and a density from 1.2 to 2.0 g/cm³.

14 Claims, 1 Drawing Figure

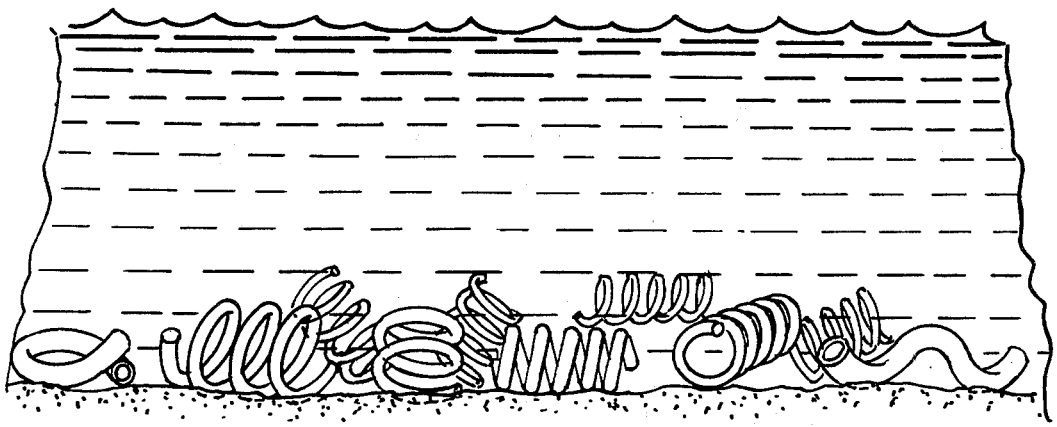

ARTIFICIAL HABITATS

The present invention relates to artificial habitats for rearing fish and crustaceans on the bed of the sea or of fresh water and to a method of making such habitats.

It is well known that wrecks of sunken ships provide very favorable environments for fish and crustaceans. Coastal fisherman have long taken advantage of this fact.

At the present time there is a tendency for the fish population in the fishing grounds to decrease because of the destruction of the sea bed environment by industrial fishing techniques and the creation of artificial habitats is a solution which has been suggested for regenerating the fish population of coastal waters.

The creation of these artificial habitats is intended to attract aquatic flora, crustaceans, and fish to a known location. Food may then be supplied to encourage rearing.

Hitherto such artificial environments have been provided by depositing abandoned cars or blocks of cement on the sea bed. However, car bodies have a limited life owing to the effects of corrosion and erosion. Blocks of concrete tend gradually to sink into the sea bed because of their high density and they have a basicity which is too high to encourage the growth of flora thereon.

The artificial habitats according to the present invention are intended, and it is, as an object of this invention, to avoid or reduce these disadvantages.

According to one aspect of the invention, there is provided an artificial habitat for rearing aquatic fauna, which comprises a plurality of structures deposited on the bed of the sea, lakes, rivers or the like, in which the structures comprise longitudinal members shaped in helicoidal turns composed of thermoplastic material having a density from 1.2 to 2 $g/cm^3$.

The members may be hollow or solid, compact or cellular and of any cross-section, for example rectangular, circular, elliptical or multilobular.

The preferred values of the dimensional parameters which characterize the structures, such as their length L, diameter D and the pitch 1 of the turns, and also the shape and dimensions of the cross-section, depend on the aquatic species for which the device is intended. Generally the length L is at least 50 cm, the diameter D is from 10 to 200 cm and the pitch 1 from 2 to 150 cm. In the case of a circular cross-section the diameter of the members may be from 2 to 15 cm. A typical structure may have a length L of 200 cm, a diameter D of 80 cm and a pitch of 1 to 8 cm and may be obtained from a tubular member having a circular cross-section of 1.2 cm internal diameter and 4 cm external diameter.

The arrangement of the structures on the sea bed may vary accordinng to the aquatic species for which they are intended. In the case of fish such as goldfish, bass, and red mullet, it is preferable to arrange them in parallel rows whereas, with crustaceans, a random distribution is preferred.

The use of thermoplastic materials allows structures to be made having a rougher or smoother surface as desired depending on the flora and fauna which it is desired to attract. A rough surface may be obtained, for example, during manufacture of the members from thermoplastic material, by addition of appropriate filler material, such as ash, for example of the kind obtained from municipal incinerators and power stations.

The members may be made in known manner, such as by extrusion through a die of a molten mass of the thermoplastic material, optionally mixed with the filler material. After extrusion, the member is formed into the appropriate shape, then cut at intervals into pieces.

Any thermoplastic material which, alone or with the filler, yields members having a density from 1.2 to 2 $g/cm^3$ may be used for making the members: polymers and copolymers of vinyl chloride may be used.

An important economic advantage of the invention stems from the fact that the members may be prepared from waste or scrap plastics material, such as reject material from industrial processes. The use of the invention thus contributes to the disposal and utilization of such waste. Before use, the waste material may be washed with water, ground or crushed and dried.

Embodiments of the invention will now be described, by way of illustration, in the following examples.

EXAMPLE 1

Waste thermoplastic sheet material, based on rigid polyvinyl chloride, is crushed to give particles not exceeding 1 cm in size.

A mixture is prepared of 100 parts by weight of the waste material and 30 parts by weight of ash from municipal incinerators.

The mixture is extruded at 180° C. by means of a rotating plate extruder, provided with two disc plates 18 cm in diameter, separated by a gap 1.2 cm wide, and a tubular die. The speed of the rotating plate is 130 revs/minute and the rate of feed of material is 120 kg/hour.

The tubular member obtained which has an internal diameter of 1.2 cm and an external diameter of 4.0 cm is wound in helicoidal turns by means of a shaping device and then cut at regular intervals into shorter lengths. Structures are obtained having the following dimensions: length (L) = 200 cm, diameter (D) = 80 cm, pitch (1) = 8 cm. These structures, deposited on the sea bed, form an artificial habitat for fish and crustaceans.

EXAMPLE 2

The procedure of Example 1 is followed except that 20 parts by weight of the polyvinyl chloride waste is replaced by waste polyethylene sheet. The structures obtained, deposited on the sea bed, provide an artificial habitat for fish and crustaceans.

We claim:

1. An artificial habitat for rearing aquatic fauna, which comprises a plurality of structures deposited on the bed of a body of water, the structures comprising longitudinal elongate helicoidal members of thermoplastic material having a density from 1.2 to 2 $g/cm^3$.

2. A habitat according to claim 1 in which the members are in the form of solid or hollow members.

3. A habitat according to claim 1 in which the members are of a cross-section selected from the group consisting of rectangular, circular, elliptic or multilobular cross-section.

4. A habitat according to claim 1 in which the helical structure is dimensioned to have a length at least 50 cm, a diameter of from 10 to 200 cm and a pitch of the helix from 2 to 150 cm.

5. A habitat according to claim 3 in which the members are circular in cross-section and of a diameter from 2 to 15 cm.

6. A habitat according to claim 1 in which the structures are arranged in parallel rows on the bed.

7. A habitat according to claim 1 in which the structures are deposited at random on the bed.

8. A habitat according to claim 1 in which the members are obtained by extrusion of the thermoplastic material.

9. A habitat according to claim 1 in which the thermoplastic material comprises a polymer or copolymer based on vinyl chloride.

10. A habitat according to claim 1 in which the thermoplastic material contains a filler capable of imparting a rough surface to the structures.

11. A habitat according to claim 10 in which the filler comprises ash obtained from municipal incinerators, power stations and the like.

12. A habitat according to claim 1 in which the members are solid.

13. A habitat according to claim 1 in which the members are cellular.

14. A method of making an artificial habitat for rearing aquatic fauna, which comprises depositing on the bed of a body of water a plurality of longitudinal members of helicoidal shape of thermoplastic material having a density from 1.2 to 2 g/cm$^3$.

* * * * *